(12) United States Patent
Yoo et al.

(10) Patent No.: US 11,772,553 B2
(45) Date of Patent: Oct. 3, 2023

(54) STEERING WHEEL

(71) Applicant: KOMOS CO., LTD., Gyeonggi-do (KR)

(72) Inventors: In Chul Yoo, Hwaseong-si (KR); Hyeoung Seok Song, Suwon-si (KR); Won Woo Chi, Hwaseong-si (KR); Jeong Su Oh, Suwon-si (KR); Ihn Joo Jae, Hwaseong-si (KR)

(73) Assignee: KOMOS CO., LTD., Hwaseong-si (KR)

( * ) Notice: Subject to any disclaimer, the term of this patent is extended or adjusted under 35 U.S.C. 154(b) by 127 days.

(21) Appl. No.: 17/527,529

(22) Filed: Nov. 16, 2021

(65) Prior Publication Data

US 2022/0169173 A1    Jun. 2, 2022

(30) Foreign Application Priority Data

Nov. 27, 2020 (KR) .......................... 10-2020-0163284

(51) Int. Cl.
*B62D 1/04* (2006.01)
*B60Q 3/283* (2017.01)

(52) U.S. Cl.
CPC ............. *B60Q 3/283* (2017.02); *B62D 1/04* (2013.01); *B60Q 2300/122* (2013.01)

(58) Field of Classification Search
CPC . B62D 1/04; B62D 1/046; B62D 1/06; B62D 1/065; B62D 1/08; B62D 1/10; B62D 1/105; B60Q 1/0082; B60Q 1/1484; B60Q 3/283; B60Q 2300/122
See application file for complete search history.

(56) References Cited

U.S. PATENT DOCUMENTS

| | | | | |
|---|---|---|---|---|
| 2004/0036593 | A1* | 2/2004 | Yamamoto | B60L 58/10 340/455 |
| 2017/0106786 | A1* | 4/2017 | Ebina | B60Q 3/80 |
| 2018/0118109 | A1* | 5/2018 | Fujisawa | G02B 27/01 |
| 2018/0201192 | A1* | 7/2018 | Ishida | B60R 1/08 |
| 2018/0336329 | A1* | 11/2018 | Walford | B60Q 3/00 |

FOREIGN PATENT DOCUMENTS

| | | | | |
|---|---|---|---|---|
| DE | 102007052258 | A1 * | 6/2008 | ............ B62D 1/046 |
| DE | 102011076340 | A1 * | 11/2012 | ............ B60Q 1/323 |
| JP | 2017218031 | A | 12/2017 | |
| KR | 20-0470786 | Y1 | 1/2014 | |
| KR | 20200100514 | A | 8/2020 | |
| WO | 2020174614 | A1 | 9/2020 | |

OTHER PUBLICATIONS

Machine Translation of DE-102007052258-A1.*
Machine Translation of DE-102011076340-A1.*

* cited by examiner

*Primary Examiner* — Daniel D Yabut
*Assistant Examiner* — Brian J McGovern
(74) *Attorney, Agent, or Firm* — Dinsmore & Shohl LLP; Yongsok Choi, Esq.

(57) ABSTRACT

A steering wheel is provided. A steering wheel of a vehicle capable of autonomous driving includes a grip unit having a rim shape and held by a driver to steer the vehicle, an illumination unit provided in each of a left portion and a right portion of the grip unit in a circumferential direction of the grip unit, and a control unit configured to control the illumination unit to light up in a hold induction pattern for inducing holding by the driver according to a situation of the vehicle and a vehicle state pattern for guiding the driver through a state of the vehicle.

21 Claims, 14 Drawing Sheets

STEERING WHEEL

CROSS-REFERENCE TO RELATED APPLICATIONS

This application claims priority to Korean Patent Application No. 10-2020-0163284 filed on Nov. 27, 2020, the entire contents of which are herein incorporated by reference.

TECHNICAL FIELD

The present disclosure relates to a steering wheel. More particularly, the present disclosure relates to a steering wheel using an illumination unit for inducing a driver's response according to the state or situation of a vehicle or transmitting vehicle information to the driver in autonomous vehicles.

BACKGROUND ART

A means for providing information on the state of a vehicle is concentrated in a cluster in front of a driver's seat. As clusters shift from analog to digital with advances in technology, the clusters can provide drivers with a variety of pieces of information that have not been provided before.

However, as a large amount of information is provided through a small cluster, it is difficult for a driver to recognize the information.

In addition, as autonomous vehicles are developed, a driver's response in an urgent situation is essential, but it is difficult to solve this problem with a small cluster.

PRIOR ART DOCUMENTS

Patent Document (Patent document 1) KR 0470786 Y1 (2014.01.02)

DETAILED DESCRIPTION

Technical Problem

Provided is a steering wheel including an illumination unit capable of providing a variety of pieces of visual information in order to induce a driver's action or transmit clear information to the driver.

Provided is a steering wheel capable of increasing driver's purchasing power for a vehicle by providing a sense of aesthetics to the driver through an illumination unit provided on the steering wheel.

The technical problems of the present disclosure are not limited to the above-mentioned contents, and other technical problems not mentioned will be clearly understood by a person skilled in the art from the following description.

Solution to Problem

According to an embodiment of the present disclosure, a steering wheel of a vehicle capable of autonomous driving includes a grip unit having a rim shape and held by a driver to steer the vehicle; an illumination unit provided in each of a left portion and a right portion of the grip unit in a circumferential direction of the grip unit and configured to light up in a predetermined pattern; and a control unit configured to control the illumination unit to light up in a hold induction pattern for inducing holding by the driver according to a situation of the vehicle and a vehicle state pattern for guiding a state of the vehicle to the driver.

The illumination unit may include a first illuminator including a plurality of light-emitting devices provided around a portion where a spoke is connected to the grip unit in order to express the hold induction pattern, the first illuminator being provided in each of left and right portions of the grip unit in a circumferential direction of the grip unit; and a second illuminator provided at a different location from the first illuminator and in a different shape from the first illuminator in order to guide the vehicle state pattern.

The hold induction pattern may be to control the illumination unit to sequentially light up and light out in a first color in the circumferential direction of the grip unit.

The control unit may be configured to control the illumination unit to light up in a hold notification pattern different from the hold induction pattern when the driver holds the grip unit.

The hold notification pattern may be to control the illumination unit to sequentially light up and light out in a different color from the hold induction pattern in the circumferential direction of the grip unit.

The control unit may be further configured to control the illumination unit to light up and light out in a different color from the hold induction pattern in the circumferential direction of the grip unit, when the driver already holds the grip unit when the engine of the vehicle starts.

The control unit may be further configured to control the illumination unit to light up in a warning pattern in a warning situation according to a signal of an advanced driver assistance system (ADAS) of the vehicle.

The control unit may be further configured to change a lighting pattern of the illumination unit according to whether the vehicle is autonomously driven, and change the lighting pattern or a color of the illumination unit according to whether the driver touches the grip unit during autonomous driving of the vehicle.

The control unit may be further configured to control the illumination unit to light up in an approval pattern when the driver switches to a manual driving mode during autonomous driving of the vehicle.

When the end of an autonomous driving mode is expected, the control unit may be further configured to control the illumination unit to light up in a hold induction pattern a certain time earlier than an end expected time point in order to induce the driver to hold the grip unit.

The control unit may be further configured to control the illumination unit to flicker in conjunction with a turn indicator of the vehicle.

The control unit may be further configured to control the illumination unit to flicker in conjunction with a blind-spot warning of the vehicle.

The control unit may be further configured to control a light area of the first illuminator to sequentially increase according to a battery charging state of the vehicle.

The control unit may be further configured to control the light-emitting devices of the illumination unit to light up in different colors when the vehicle enters a utility mode.

The illumination unit may further include a third illuminator provided on a hub portion of the steering wheel, and the control unit may be further configured to control the third illuminator to light up in different colors according to different driving modes of the vehicle.

According to another embodiment of the present disclosure, a steering wheel of a vehicle capable of autonomous driving includes a grip unit having a rim shape and held by a driver to steer the vehicle; an illumination unit provided to be symmetrical in left and right portions of the grip unit; and a control unit configured to control the illumination unit to light up in a hold induction pattern for inducing holding by the driver according to a situation of the vehicle and a vehicle state pattern for guiding a state of the vehicle to the driver.

The hold induction pattern may be to change brightness of the illumination unit according to a first period signal that is previously determined.

The control unit may be further configured to control the illumination unit to light up in a hold notification pattern corresponding to flickering when the driver holds the grip unit.

When the door of the vehicle is open, the control unit may be further configured to control the illumination unit so that the brightness of the illumination unit varies according to a second period signal having a slower period than the first period signal.

The control unit may be further configured to control the illumination unit to light up in a warning pattern, in a warning situation according to a signal of an ADAS of the vehicle, and control the illumination unit so that the warning pattern is concluded when the driver holds the grip unit.

The control unit may be further configured to change a lighting pattern of the illumination unit according to whether the vehicle is autonomously driven, and change the lighting pattern or a color of the illumination unit according to whether the driver touches the grip unit during autonomous driving of the vehicle.

When the end of an autonomous driving mode is expected, the control unit may be further configured to control the illumination unit to light up in a hold induction pattern a certain time earlier than the end expected time point in order to induce the driver to hold the grip unit.

The illumination unit may be provided in a form of strips that are each arranged in a horizontal direction of the grip unit or at a predetermined angle.

Advantageous Effects of Disclosure

A steering wheel according to an embodiment of the present disclosure may be provided with an illumination unit capable of providing a variety of pieces of visual information in order to induce a driver's action or transmit clear information to the driver.

The steering wheel may increase driver's purchasing power for a vehicle by providing a sense of aesthetics to the driver through the illumination unit provided on the steering wheel.

The effects of the present disclosure are not limited to the above-mentioned contents, and other effects not mentioned will be clearly understood by a person skilled in the art from the following description.

DETAILED DESCRIPTION

Figure 1:
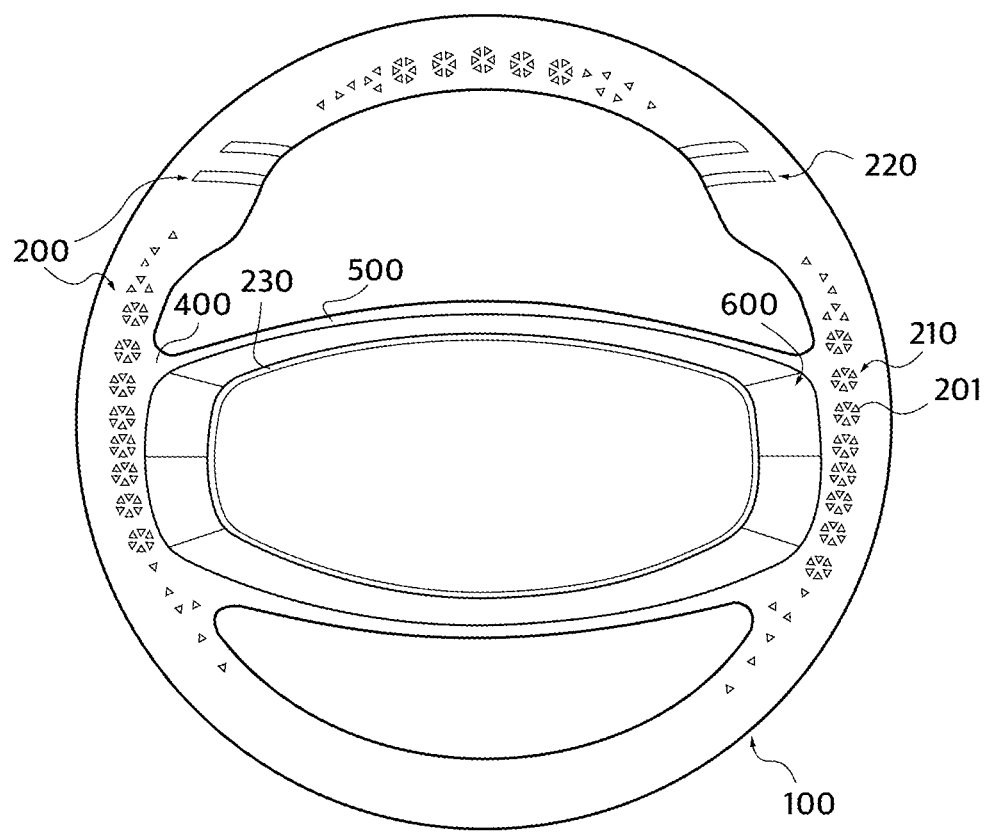
FIG. 1 is a front view of a steering wheel according to an embodiment of the present disclosure.

Embodiments of the present disclosure will now be described more fully with reference to the accompanying drawings such that one of ordinary skill in the art to which the present disclosure pertains may easily execute the present disclosure. The present disclosure may, however, be embodied in many different forms and should not be construed as being limited to the embodiments set forth herein. In the drawings, elements irrelevant to the descriptions of the present disclosure are omitted to clearly explain embodiments of the present disclosure.

The terms used in the present specification are merely used to describe particular embodiments, and are not intended to limit the present disclosure. An expression used in the singular may encompass the expression of the plural, unless it has a clearly different meaning in the context.

In the present specification, it may be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In addition, the components shown in the embodiments of the present disclosure are shown independently to indicate different characteristic functions, and do not mean that each component is separate hardware or one software component. In other words, for convenience of description, each component is listed and described as each component, and at least two components of each component may be combined to form one component, or one component may be divided into a plurality of components to perform a function. The integrated and separate embodiments of each component are also included in the scope of the present disclosure without departing from the essence of the present disclosure.

In addition, the following embodiments are provided to more clearly explain the present disclosure to one of ordinary skill in the art, and the shapes and sizes of elements in the drawings may be exaggerated for more clear description.

Hereinafter, the present disclosure will be described more fully with reference to the accompanying drawings, in which embodiments of the present disclosure are shown.

Figure 2:
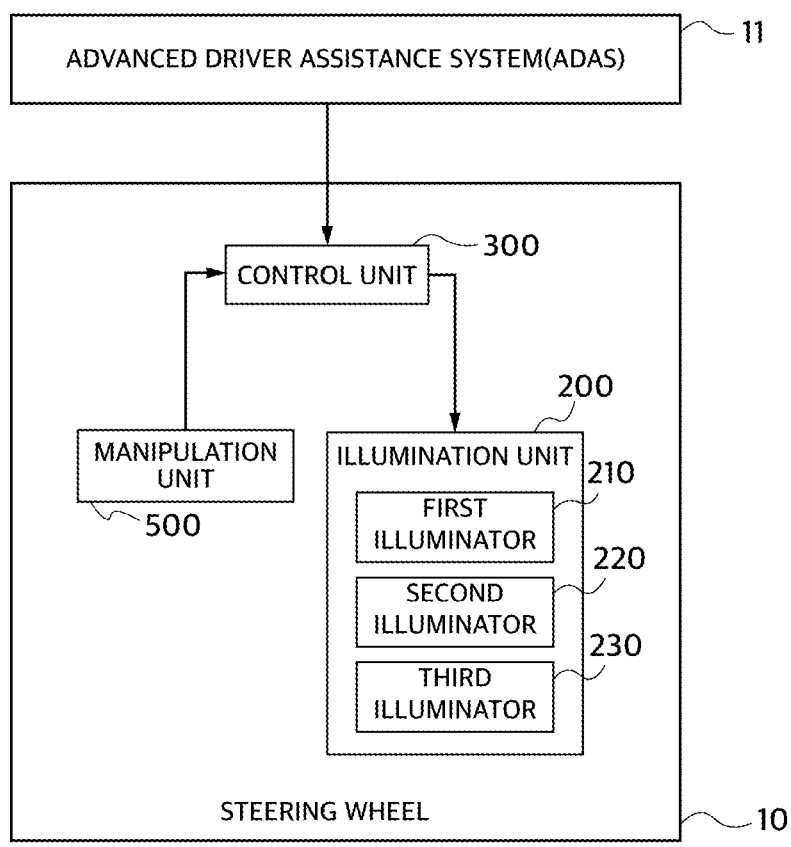
FIG. 2 is a block diagram illustrating a structure of a steering wheel according to an embodiment of the present disclosure.
Figure 3:
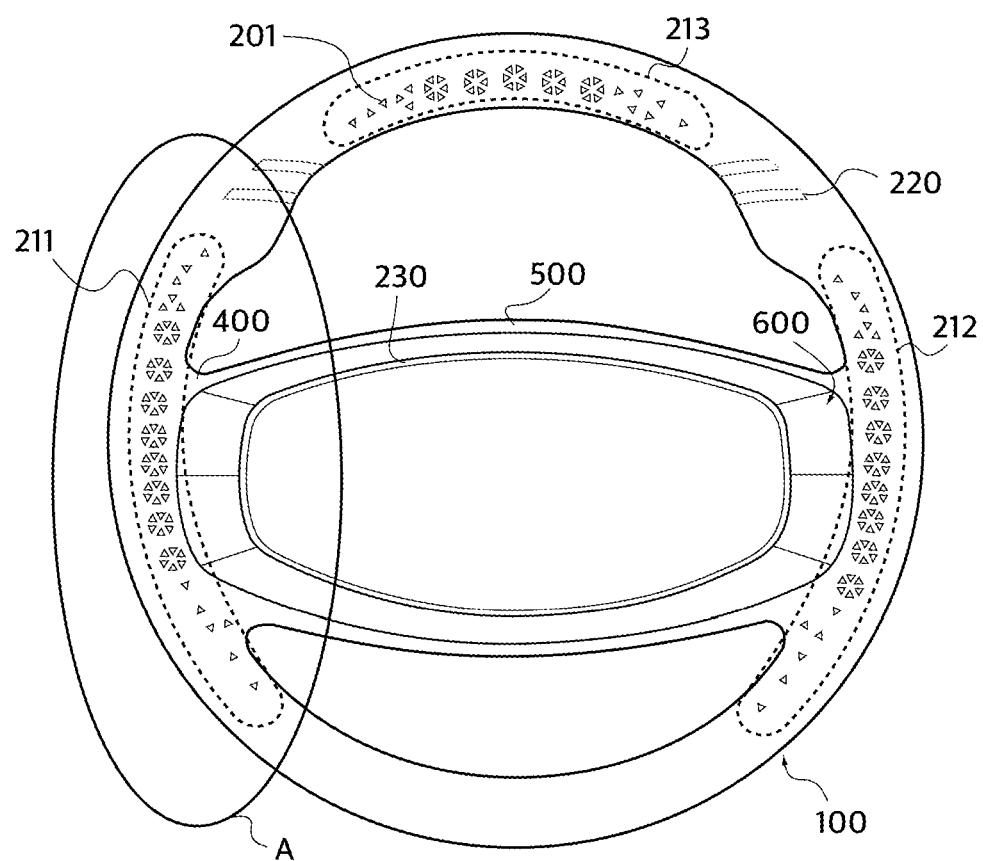
FIG. 3 is a view illustrating an illumination unit of a steering wheel according to an embodiment of the present disclosure.

FIG. 1 is a front view of a steering wheel according to an embodiment of the present disclosure, and FIG. 2 is a block diagram illustrating a structure of a steering wheel according to an embodiment of the present disclosure. FIG. 3 is a view illustrating an illumination unit of a steering wheel according to an embodiment of the present disclosure.

Referring to FIGS. 1 through 3, a steering wheel 10 according to an embodiment of the present disclosure is mounted on a vehicle capable of autonomous driving in order to induce a driver's response according to the state or situation of the vehicle or transmit vehicle information to the driver, and may include a grip unit 100, an illumination unit 200, a control unit 300, a spoke 400, and a hub 500.

The autonomous driving may refer to driving of a vehicle to which a technology classified into Level 2 to Level 5 established by the National Highway Traffic Safety Administration (NHTSA) is applied.

In more detail, the level of autonomous driving technology classified by the NHTSA is classified into Level 0 to Level 5. Level 0 is a non-automation stage, in which a driver performs all driving actions of his or her vehicle. Vehicles in Level 0 require a driver to always control safety functions such as braking, speed control, and steering, and pay attention to traffic monitoring and safe operations. Level 1 is a driver assistance stage, and may be a stage in which an advanced driver assistance system (ADAS) assists a driver in driving. In Level 1 vehicles, a driver assistance system partially assists with steering or braking/acceleration, but does not all at the same time, and thus a driver must be aware of a situation and pay attention to driving. Level 2 is a partial automation stage, and may be a stage in which a driver assistance system partially exercises control of a vehicle in a specific situation. In Level 2 vehicles, a driver assistance system can simultaneously control steering and braking/acceleration in some situations, but a driver must always pay attention to traffic conditions. Level 3 is a conditional automation stage, and may be a stage in which a vehicle travels with all control rights instead of a driver in some specific situations. Vehicles in Level 3 can autonomously perform all parts of driving by using an automated driving system (ADS) when there is a driver's request. However, drivers must pay attention to traffic conditions so that the ADS can regain control at any time upon request for transfer of control. Level 4 is a high automation stage, and may be a stage in which a vehicle has full control instead of a driver and can monitor all traffic conditions. In Level 4 vehicles, an ADS performs all driving and traffic monitoring instead, and a driver does not need to pay attention to traffic conditions. Level 5 is a full automation stage, and may be a stage in which an ADS controls all components of a vehicle. Vehicles in Level 5 do not require a driver's manipulations at all, and an ADS takes over all driving actions. In Level 5, a driver is just a passenger, so there is no need to pay attention to traffic conditions.

According to the present embodiment, the grip unit 100 is provided to be held by a driver to steer a vehicle, and may have a rim shape.

The illumination unit 200 is included to provide visual information in order to inform the driver of states or conditions of the vehicle, and a plurality of light-emitting devices 201 may be provided on the grip unit 100 or the spoke 400 and the hub 500 and light up in a certain pattern under the control of the control unit 300. The driver may recognize a state or situation of the vehicle by checking the lighting pattern of the illumination unit 200.

The illumination unit 200 may include a first illuminator 210, a second illuminator 220, and a third illuminator 230.

The first illuminator 210 is included to provide visual information about holding of the grip unit 100, and a plurality of light-emitting devices 201 may be provided apart from each other in a circumferential direction of the grip unit 100 around a first region 211 and a second region 212 where the spoke 400 and the grip unit 100 are connected to each other. The first region 211 and the second region 212 may be regions of the grip unit 100 that are naturally held by the driver when the steering wheel 10 is centrally aligned. According to an embodiment, the first illuminator 210 may also be provided on a third region 213. The third region 213 may be a region of the grip unit 100 other than the first region 211 and the second region 212. According to the present embodiment, the third region 213 may be an upper portion of the grip unit 100 when the steering wheel 10 is centrally aligned.

According to the present embodiment, the first illuminator 210 may have a shape in which light-emitting devices 201 form a group and have a pattern. The shape of the first illuminator 210 may not only provide visual information to the driver but also provide an aesthetic effect.

The second illuminator 220 is included to provide visual information about the state or situation of the vehicle, and may be provided at a different location and in a different shape from the first illuminator 210. According to the present embodiment, the second illuminator 220 may be provided in right and left upper portions of the grip unit 100 in a symmetrical configuration so that the driver may recognize the right and left sides.

The third illuminator 230 is included to provide visual information about the driving mode of the vehicle, and may be provided on the hub 500. According to the present embodiment, the third illuminator 230 may be provided along the perimeter of the manipulation unit 600 provided on the hub 500, and may provide driving mode information of the vehicle to the driver by lighting up in different colors according to different driving modes of the vehicle. A color suitable for an image associated with each color may be allocated to each driving mode, thereby creating a driving atmosphere of the corresponding driving mode. For example, a red color is allocated to a 'sports driving mode' to create an active and powerful driving atmosphere when driving in the 'sports driving mode', and a blue color is allocated to a 'comfortable driving mode' to create a quiet and comfortable driving atmosphere when driving in the 'comfortable driving mode'. A green color is allocated to an 'eco driving mode' to create an atmosphere of driving in the nature.

The control unit 300 is included to control the illumination unit 200 to induce a driver's response according to the state or situation of the vehicle or transmit vehicle information to the driver, and thus may control the illumination unit 200 to light up in a pattern allocated for each state and situation of the vehicle. For example, the control unit 300 may control the illumination unit 200 to light up in a hold induction pattern for inducing holding by the driver according to the situation of the vehicle and a vehicle state pattern for guiding the state of the vehicle to the driver.

The control unit 300 may receive information about the state or situation of the vehicle from an advanced driver assistance system (ADAS) 11 including a plurality of sensors respectively provided on some points on the vehicle, and may control the illumination unit 200 according to the information.

The ADAS 11 may include at least one of a forward collision-avoidance assist (FCA) system, a lane following assist (LFA) system, a lane keeping assist (LKA) system, and a smart cruise control (SCC) system, a highway driving assist (HDA) system, a blind-spot collision warning (BCW) system, a rear view monitor (RVM) system, and a rear cross-traffic collision-avoidance assist (RCCW) system.

The manipulation unit 600 is a switch for executing functions of the vehicle, and may be provided on the spoke 400 or the hub 500. The manipulation unit 600 includes buttons or switches for activating various functions of the vehicle. According to the present embodiment, the manipulation unit 600 may also include a button for switching between an autonomous driving mode and a manual driving mode.

According to the present embodiment, a lighting pattern of the illumination unit 200 controlled by the control unit 300 may include one or more of a door-open pattern, a start-off pattern, an autonomous driving pattern, a simple touch pattern, a hold induction pattern, a hold notification pattern, a function release pattern, and a while-driving driver warning pattern, a blind spot warning pattern, an approval pattern, a turn indicator pattern, a charging pattern, and a utility pattern. However, the lighting pattern is not limited thereto, and any pattern pre-allocated for lighting under a preset condition is possible.

Hereinafter, the lighting color of the lighting pattern is according to an embodiment, and is not limited to the color described below.

The door-open pattern may be a pattern in which the illumination unit 200 lights up, when the driver opens the door of the vehicle in a state where the engine of the vehicle is turned off, and the start-off pattern may be a pattern in which the illumination unit 200 lights up, when the driver turns off the engine of the vehicle in a state where the engine of the vehicle is turned on. According to the present embodiment, the door-open pattern and the start-off pattern may have orders opposite to each other.

The autonomous driving pattern notifies the driver that the vehicle is in an autonomous driving mode, in order to prevent occurrence of driver's manipulation mistakes, when the vehicle is in the autonomous driving mode, and may be a pattern in which the first illuminator 210 repeats gradual lighting up and gradual lighting out at certain intervals. For example, the autonomous driving pattern may be a pattern in which the first illuminator 210 has a period of a total of 6 seconds and lights up in blue for 3 seconds in the first half and lights out for 3 seconds in the second half. This autonomous driving pattern may express a standby state of the vehicle to the driver by adopting a sleep breathing cycle of a person.

The simple touch pattern is provided when the driver simply touches the grip unit 100 instead of holding the grip unit 100 in order to perform steering when the vehicle is in the autonomous driving mode, and thus may be a pattern that has a different color from the lighting pattern of the autonomous driving pattern. For example, the simple touch pattern may be a pattern in which the first illuminator 210 lights up and lights out in white at a faster interval than the autonomous driving pattern or the first illuminators 210 of the first region 211 and the second region 212 may flicker at the same time.

Figure 4:
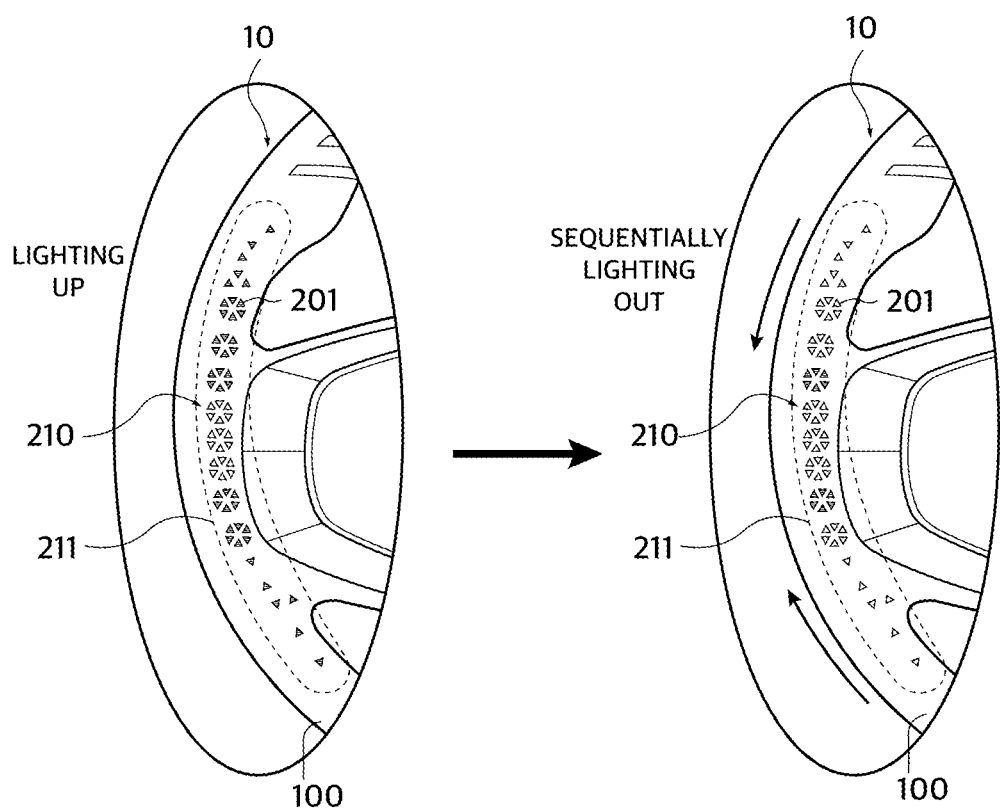
FIG. 4 is a partial view of a circle region A of FIG. 3, and illustrates that an illumination unit according to an embodiment of the present disclosure lights up in a hold induction pattern.

FIG. 4 is a partial view of a circle region A of FIG. 3, and illustrates that an illumination unit according to an embodiment of the present disclosure lights up in the hold induction pattern.

Referring to FIG. 4, the hold induction pattern of the steering wheel 10 according to an embodiment of the present disclosure is a lighting pattern for inducing a driver to hold the grip unit 100, and may be the illumination unit 200 sequentially lighting up and lighting out in a first color in the circumferential direction of the grip unit 100. In more detail, in the hold induction pattern according to the present embodiment, first, light-emitting devices 201 excluding some of the light-emitting devices 201 of the first illuminator 210 located at the center of the first region 211 may light up. Then, the light-emitting devices 201 located on both ends of the first region 211 may be sequentially turned off toward the center of the first region 211. At this time, the first illuminator 210 may light up in the first color.

Although not shown in the drawings, the first illuminator 210 of the second region 212 may perform lighting up and lighting out simultaneously with lighting up and lighting out of the first illuminator 210 of the first region 211.

Figure 5:
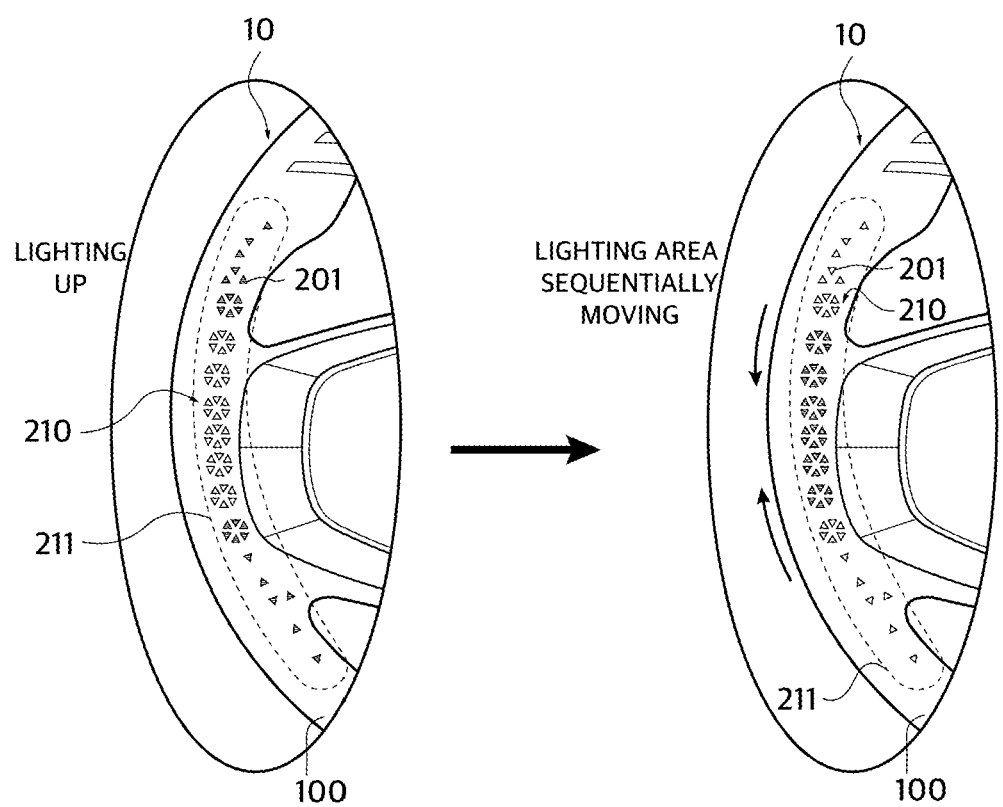
FIG. 5 is a partial view of the circle region A of FIG. 3, and illustrates that an illumination unit according to an embodiment of the present disclosure lights up in a hold notification pattern.

FIG. 5 is a partial view of the circle region A of FIG. 3, and illustrates that an illumination unit according to an embodiment of the present disclosure lights up in the hold notification pattern.

Referring to FIG. 5, the hold notification pattern of the steering wheel 10 according to an embodiment of the present disclosure is a pattern for notifying a driver that a vehicle has recognized holding by the driver when the driver holds the grip unit 100, and is different from the hold induction pattern. In more detail, in the hold notification pattern according to the present embodiment, first, some of the light-emitting devices 201 of the first illuminator 210 located on both ends of the first region 211 may light up in orange. Then, a lighted-up region may move toward the center of the first region 211.

Although not shown in the drawings, in the hold notification pattern, like in the hold induction pattern, the first illuminator 210 of the second region 212 may perform lighting up and lighting out simultaneously with lighting up and lighting out of the first illuminator 210 of the first region 211.

Figure 6:
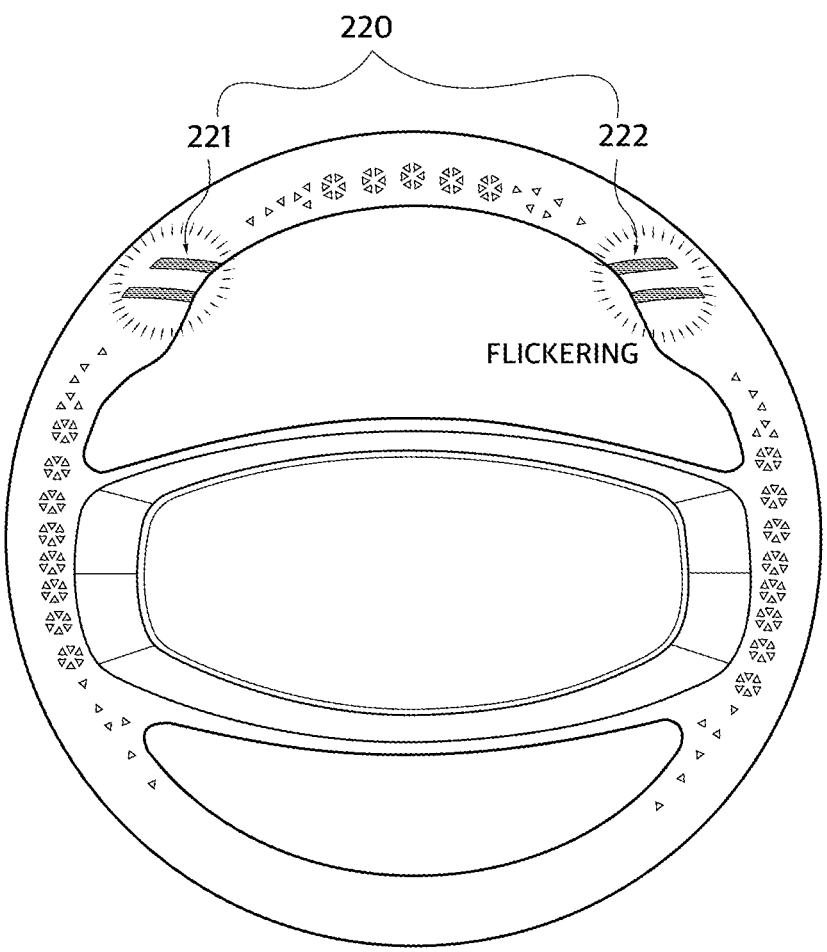
FIG. 6 is a view illustrating a lighting pattern of a second illuminator according to an embodiment of the present disclosure.

FIG. 6 is a view illustrating a lighting pattern of a second illuminator according to an embodiment of the present disclosure.

Referring to FIG. 6, the approval pattern, the warning pattern, and the turn indicator pattern of the steering wheel 10 according to an embodiment of the present disclosure may use the second illuminator 220.

The approval pattern is a pattern for informing the driver of approval of a mode switch when the driver switches the mode of a vehicle from the autonomous driving mode to the manual driving mode, and the second illuminator 220 may flicker in a preset color. For example, the approval pattern may be a pattern in which a second illuminator 221 in the left upper portion of the grip unit 100 and a second illuminator 222 in the right upper portion of the grip unit 100 flicker twice in blue at the same time.

The while-driving driver warning pattern is a pattern for drawing a driver's attention by notifying the driver of emergency braking and collision when the control unit 300 in the autonomous driving mode of the vehicle receives an emergency braking and collision situation warning signal from the ADAS 11. In the while-driving driver warning pattern, the second illuminator 220 may flicker in a different color from the approval pattern. For example, the while-driving driver warning pattern may be a pattern in which the second illuminator 221 in the left upper portion of the grip unit 100 and the second illuminator 222 in the right upper portion of the grip unit 100 flicker twice in red at the same time. The warning while driving by the second illuminator 220 may induce a driver's follow-up response, such as holding or avoiding of the grip unit 100, by informing the driver of a collision and impact situation in advance so that the driver is easy to recognize.

The blind-spot warning pattern is a pattern for drawing a driver's attention by notifying the driver of a blind spot outside the vehicle when the control unit 300 receive a blind-spot warning signal for the blind spot outside the vehicle from the ADAS 11. In the blind-spot warning pattern, the second illuminator 220 may flicker in a different color from the approval pattern. For example, when a warning about a blind spot on the right side of the vehicle is generated, the second illuminator 222 in the right upper portion of the grip unit 100 may flicker in red. The blind spot warning by the second illuminator 220 may improve driving stability by intuitively warning the driver about a situation of an outside blind spot from the inside of the vehicle.

The turn indicator pattern is a pattern for clearly informing the driver of a traveling direction of the vehicle, and the second illuminator 220 located on the grip unit 100 in the traveling direction may flicker in a different color from the approval pattern and the warning pattern. For example, when the vehicle in the automatic driving mode is going to turn right or change a lane to the right lane, the second illuminator 222 in the right upper portion of the grip unit 100 may flicker in orange. The turn indicator pattern performed by the second illuminator 220 located on the grip unit 100 may inform the driver of the direction of the vehicle more intuitively than a turn indicator located on a cluster.

Figure 7:
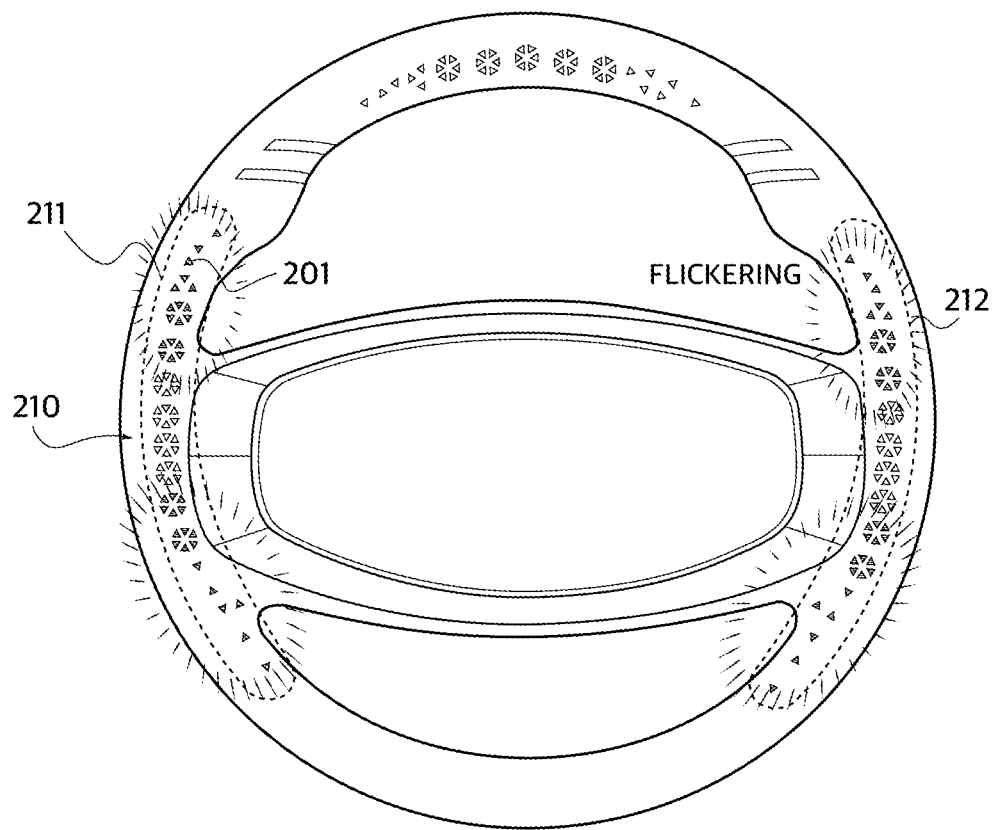
FIG. 7 is a view illustrating that an illumination unit according to an embodiment of the present disclosure lights up in a function release pattern.

FIG. 7 is a view illustrating that an illumination unit according to an embodiment of the present disclosure lights up in the function release pattern.

Referring to FIG. 7, the function release pattern of the steering wheel 10 according to an embodiment of the present disclosure is a pattern for alerting the driver by notifying the driver that the autonomous driving mode of the vehicle is released soon, and a portion of the first illuminator 210 may flicker. For example, when the vehicle traveling in the autonomous driving mode is subjected to an autonomous driving mode forced release interrupt by the ADAS 11, the light-emitting devices 201 of the first illuminator 210 located on both ends of the first region 211 and the second region 212 may flicker at a certain interval. The function release pattern may induce the driver having recognized the function release pattern to take an action corresponding to a release of the autonomous driving mode of the vehicle.

Figure 8:
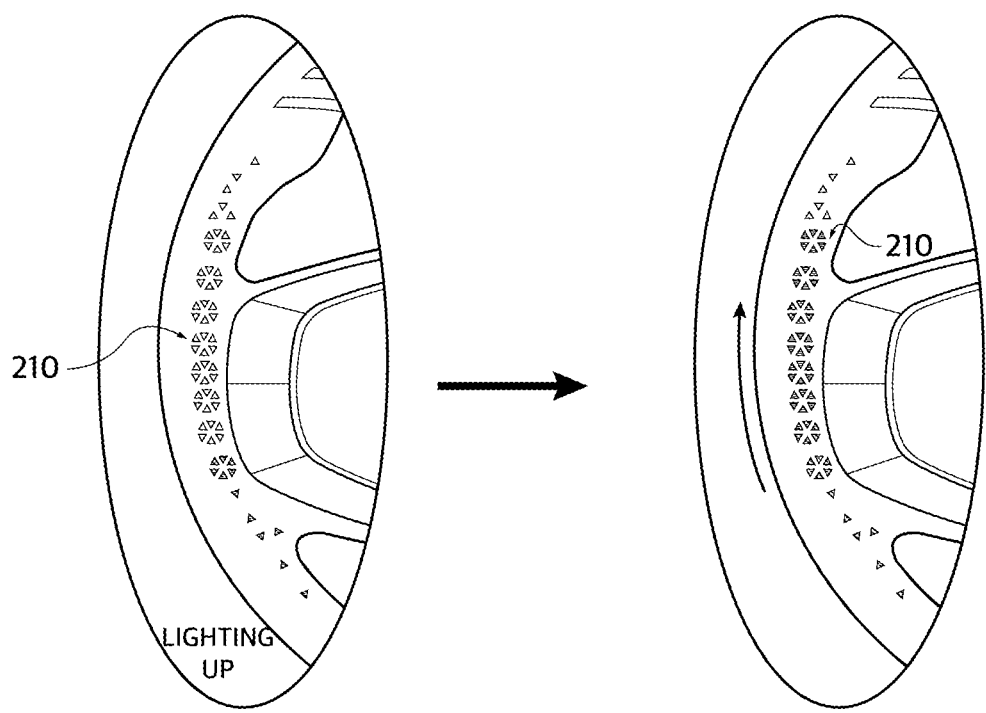
FIG. 8 is a partial view of the circle region A of FIG. 3, and illustrates that an illumination unit according to an embodiment of the present disclosure lights up in a charging pattern.

FIG. 8 is a partial view of the circle region A of FIG. 3, and illustrates that an illumination unit according to an embodiment of the present disclosure lights up in the charging pattern.

Referring to FIG. 8, the charging pattern of the steering wheel 10 according to an embodiment of the present disclosure is for indicating a fuel charging state of the vehicle, and may enable the lighting area of the first illuminator 210 to sequentially increase according to fuel charging states. Herein, a fuel may include fossil fuel, electricity, or hydrogen. For example, the lighting area of the first illuminator 210 may vary according to the fuel level of the fuel tank of a gasoline vehicle, and the lighting area of the first illuminator 210 may vary according to the amount of charging power of the battery of an electric vehicle.

Figure 9:
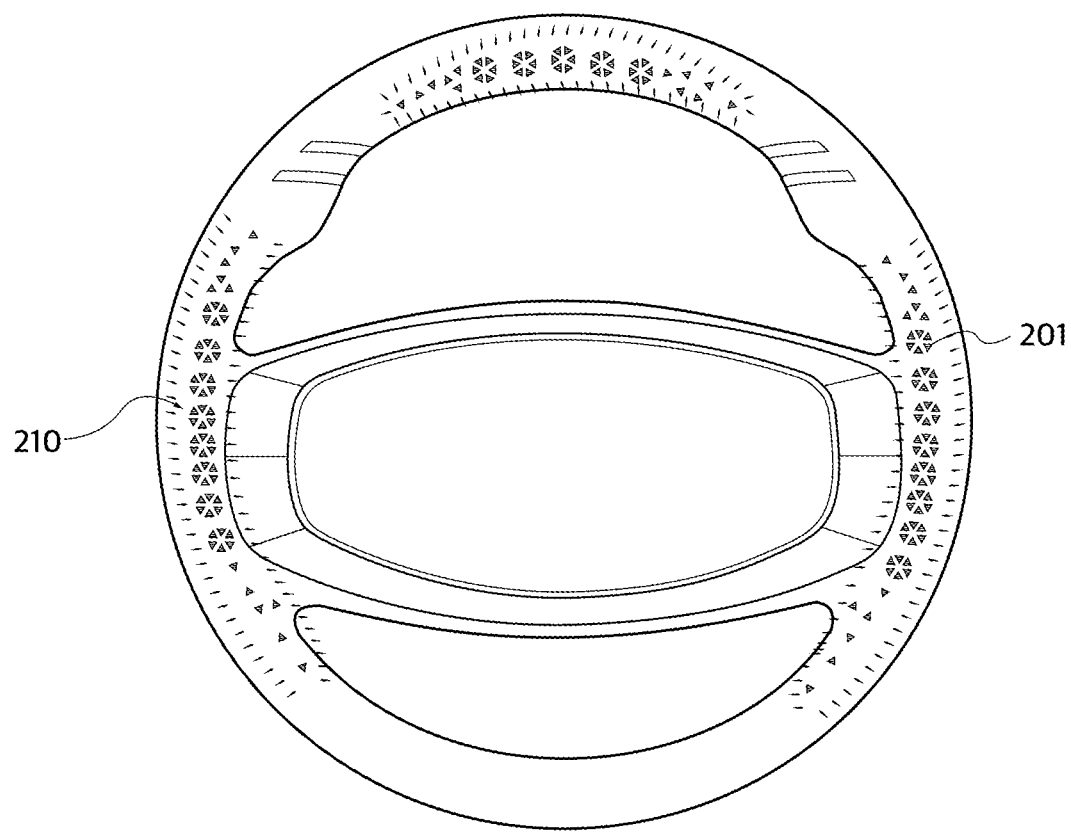
FIG. 9 is a view illustrating that an illumination unit according to an embodiment of the present disclosure lights up in a utility pattern.

FIG. 9 is a view illustrating that an illumination unit according to an embodiment of the present disclosure lights up in the utility pattern.

Referring to FIG. 9, the utility pattern of the steering wheel 10 according to an embodiment of the present disclosure is a pattern for informing the driver that a vehicle has entered a utility mode, and may be performing an aesthetic illumination by using the first illuminator 210. For example, the utility pattern may be each of the light-emitting devices 201 of the first illuminator 210 repeating lighting up and lighting out in different colors. The utility pattern may provide psychological stability to the driver by providing an emotional atmosphere to the interior space of the vehicle when the vehicle stops for a long time and the driver stays inside the vehicle, such as car camping.

Embodiments in which the illumination unit 200 of the steering wheel 10 lights up will now be described with reference to FIGS. 10 through 12.

Figure 10:
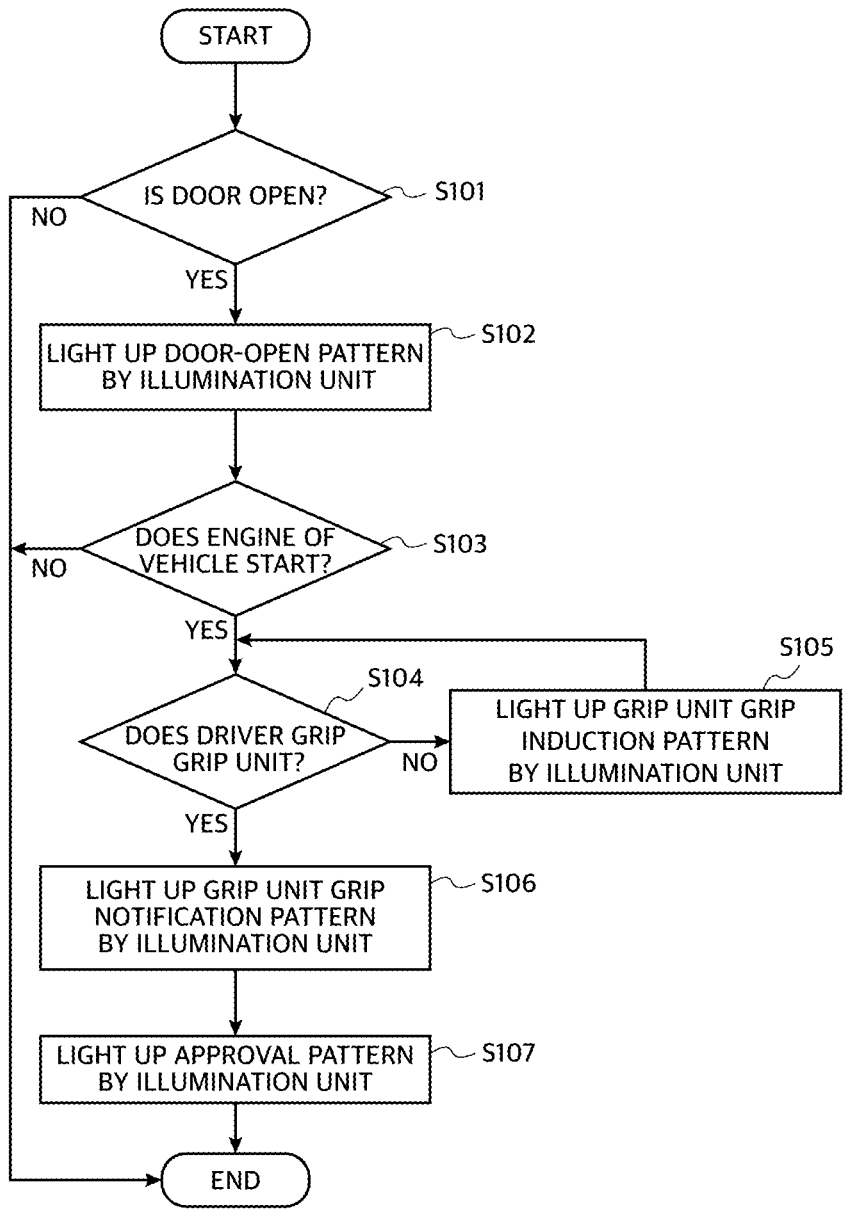
FIG. 10 is a flowchart of lighting of an illumination unit during a vehicle starting process, according to an embodiment of the present disclosure.

FIG. 10 is a flowchart of lighting of an illumination unit during a vehicle starting process, according to an embodiment of the present disclosure.

Referring to FIG. 10, when a driver opens the door of a vehicle (S101), the illumination unit 200 of the steering wheel 10 according to an embodiment of the present disclosure may light up in the door-open pattern (S102). When the engine of the vehicle starts (S103) and the driver does not hold the grip unit 100 (S104), the illumination unit 200 may induce the driver to hold the grip unit 100 by lighting up in the grip unit hold induction pattern (S105). When the driver holds the grip unit 100 (S104), the illumination unit 200 may light up in the grip unit hold notification pattern (S106), and then light up in the approval pattern (S107) to provide the driver with information indicating that the driver has the steering right of the vehicle.

Figure 11:
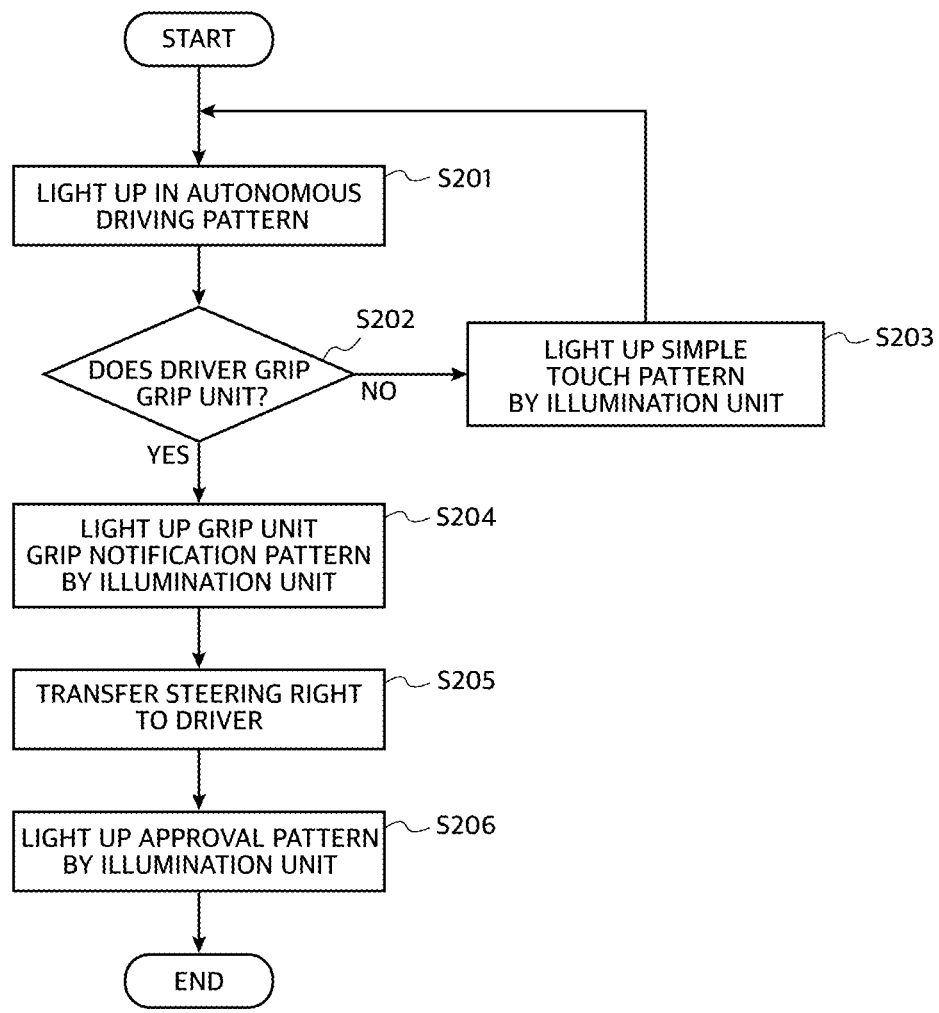
FIG. 11 is a flowchart of implementation of a lighting pattern of an illumination unit according to holding of a grip unit by a driver in a vehicle in an autonomous driving mode, according to an embodiment of the present disclosure.

FIG. 11 is a flowchart of implementation of a lighting pattern of an illumination unit according to holding of a grip unit by a driver in a vehicle in the autonomous driving mode, according to an embodiment of the present disclosure.

Referring to FIG. 11, when the vehicle enters the autonomous driving mode, the illumination unit 200 of the steering wheel 10 according to an embodiment of the present disclosure may light up in the autonomous driving pattern (S201) to provide the driver with information indicating that the vehicle has entered the autonomous driving mode.

When the driver holds or touches the grip unit 100 (S202), the control unit 300 may determine whether contact of the grip unit 100 by the driver is simple touching or holding. When it is determined that the contact is not holding, the illumination unit 200 may light up in the simple touch pattern (S203) to provide the driver with information indicating that the driver has touched the grip unit 100. When the simple touch pattern is concluded, the illumination unit 200 may again light up in the autonomous driving pattern (S201).

When the control unit 300 determines that the contact of the grip unit 100 by the driver is holding, the illumination unit 200 may light up in the grip unit hold notification pattern (S204) to provide the driver with information indicating that the driver has held the grip unit 100. After the driver holds the grip unit 100, the vehicle may automatically transfer the steering right to the driver according to the holding of the grip unit 100 by the driver, or the driver may receive the steering right from the vehicle by operating the manipulation unit 600 (S205). When the steering right is transferred to the driver, the illumination unit 200 may light up in the approval pattern (S206) to provide the user with information indicating that the steering right transfer has been approved.

Figure 12:
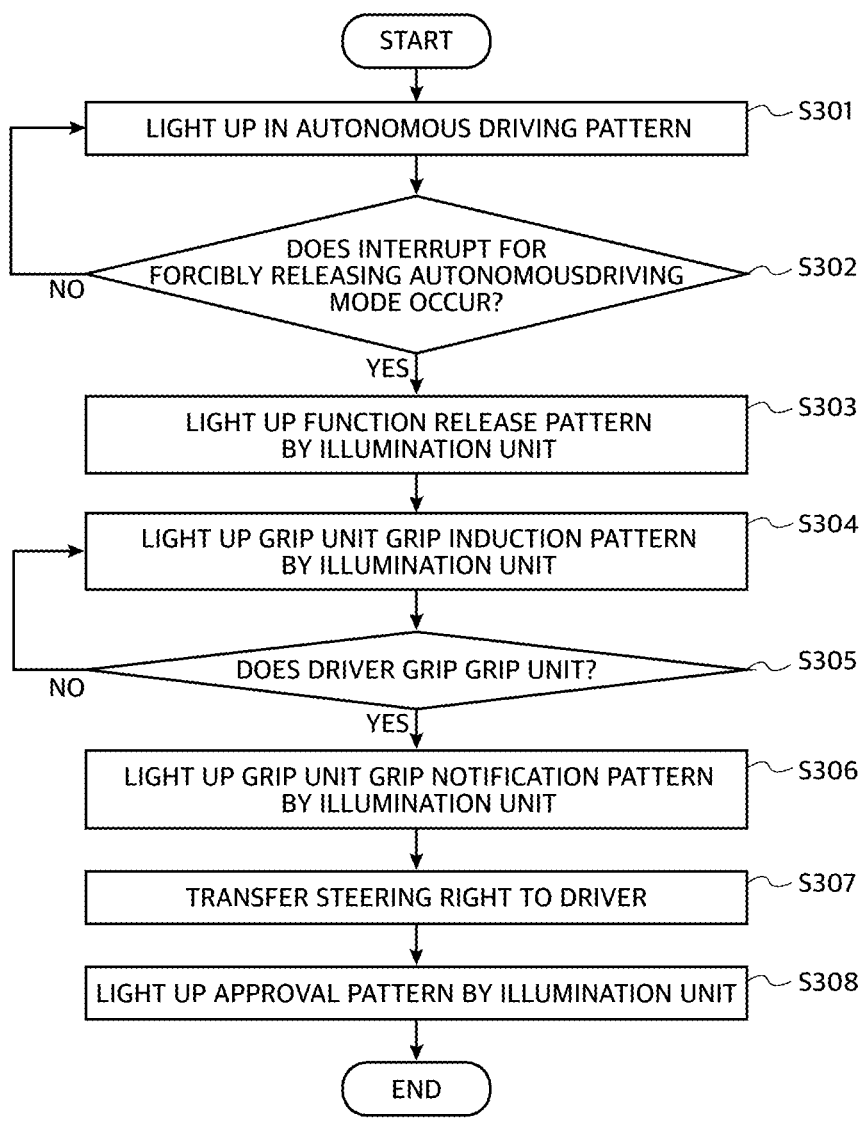
FIG. 12 is a flowchart of implementation of a lighting pattern of an illumination unit according to autonomous driving mode forced release in a vehicle in the autonomous driving mode, according to an embodiment of the present disclosure.

FIG. 12 is a flowchart of implementation of a lighting pattern of an illumination unit according to autonomous driving mode forced release in a vehicle in the autonomous driving mode, according to an embodiment of the present disclosure.

Referring to FIG. 12, when the vehicle enters the autonomous driving mode, the illumination unit 200 of the steering wheel 10 according to an embodiment of the present disclosure may light up in the autonomous driving pattern (S301) to provide the driver with information indicating that the vehicle has entered the autonomous driving mode.

When the ADAS 11 generates an interrupt for forcibly releasing the autonomous driving mode during autonomous driving (S302), the illumination unit 200 may light up in the function release pattern (S303) to provide the user with information indicating that the autonomous driving mode is released soon. Then, the illumination unit 200 may light up in the hold induction pattern (S304) to induce holding of the grip unit 100 by the driver. When the driver holds the grip unit 100 (S305), the illumination unit 200 may light up in the grip unit hold notification pattern (S306) to provide the driver with information indicating that the driver has held the grip unit 100. After the driver holds the grip unit 100, the vehicle may automatically transfer the steering right to the driver according to the holding of the grip unit 100 by the driver, or the driver may receive the steering right from the vehicle by operating the manipulation unit 600 (S307). When the steering right is transferred to the driver, the illumination unit 200 may light up in the approval pattern (S308) to provide the user with information indicating that the steering right transfer has been approved.

A steering wheel according to another embodiment of the present disclosure will now be described, and overlapping descriptions with those given above will be omitted.

Figure 13:
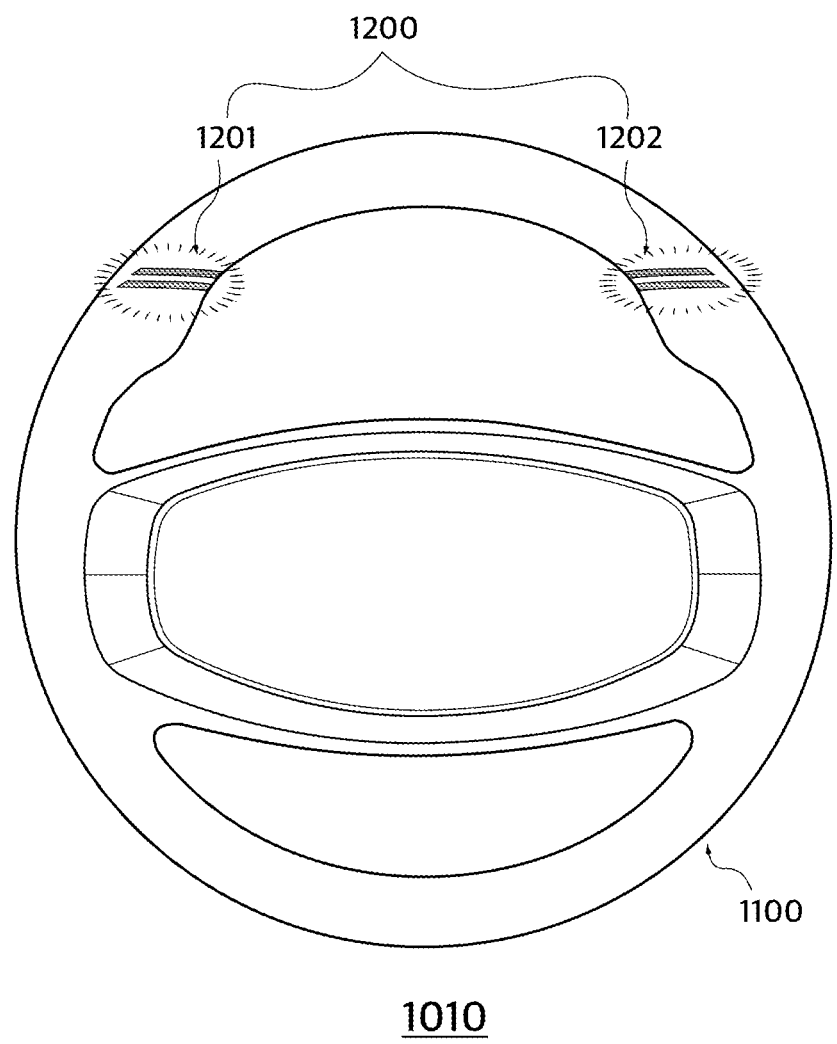
FIG. 13 is a front view of a steering wheel according to another embodiment of the present disclosure.
Figure 14:
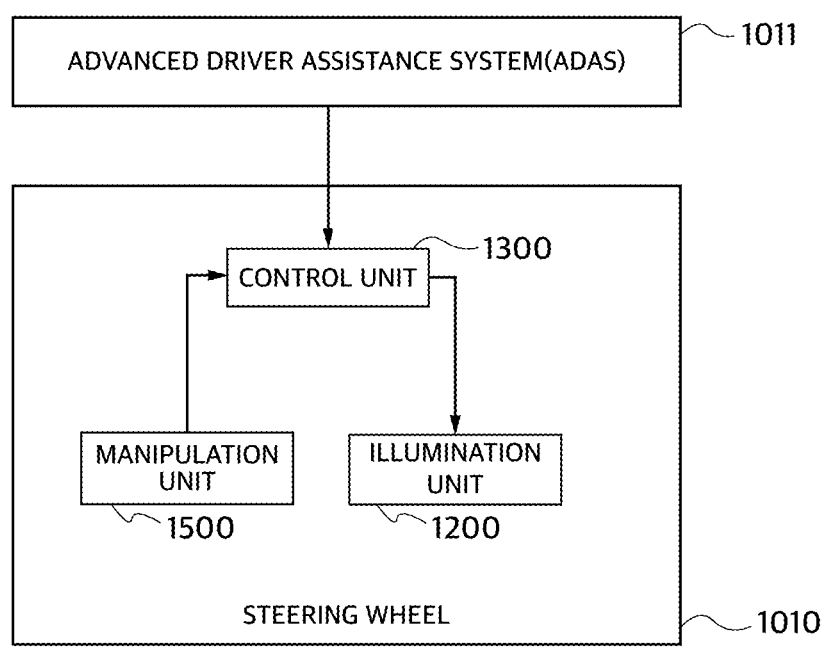
FIG. 14 is a block diagram illustrating a structure of a steering wheel according to another embodiment of the present disclosure.

FIG. 13 is a front view of a steering wheel according to another embodiment of the present disclosure, and FIG. 14 is a block diagram illustrating a structure of a steering wheel according to another embodiment of the present disclosure.

Referring to FIGS. 13 and 14, a steering wheel 1010 according to another embodiment of the present disclosure may include a grip unit 1100, an illumination unit 1200, and a control unit 1300. The steering wheel 1010 according to the present embodiment may provide a hold induction pattern or a vehicle state pattern by using the illumination unit 1200, thereby providing a driver with visual information about the state of the vehicle or the situation of the vehicle.

According to the present embodiment, the illumination unit 1200 may be provided on the grip unit 1100 to be bilaterally symmetrical in left and right portions of the grip unit 1100. In a description based on a left illumination unit 1201, the illumination unit 1200 may extend in a horizontal direction of the grip unit 1100. A plurality of illumination units may be provided such that each has a strip shape, and may be lined up. A right illumination unit 1202 may be the same as the left illumination unit 1201 and may be provided symmetrically with the left illumination unit 1201. The left illumination unit 1201 and the right illumination unit 1202 may light up or light out independently. The illumination unit 1200 may be provided in a diagonal line at a certain angle rather than in a horizontal direction.

According to the present embodiment, a pattern of the illumination unit 1200 controlled by the control unit 1300 may include one or more of a door-open pattern, a start-off pattern, an autonomous driving pattern, a simple touch pattern, a hold induction pattern, a hold notification pattern, a function release pattern, and a while-driving driver warning pattern, a blind spot warning pattern, an approval pattern, a turn indicator pattern, a charging pattern, and a utility pattern, equally with the previous embodiment.

According to the present embodiment, the hold induction pattern may be the brightness of the illumination unit 1200 varying according to a first period signal that is previously determined. For example, the first period signal may be a sine wave having a specific period.

The door-open pattern may be the brightness of the illumination unit 1200 varying according to a second period signal having a slower period than the first period signal. For example, the second period signal may be a sine wave having a longer period than the first period signal.

The hold notification pattern may be a pattern in which the illumination unit 1200 lights up and then lights out. For example, the hold notification pattern may be a pattern in which flicking occurs once in blue or white.

The while-driving driver warning pattern may be a pattern in which the illumination unit 1200 maintains flickering according to a signal of the ADAS 1011 of the vehicle. For example, the while-driving driver warning pattern may be a pattern in which flickering occurs in red until the driver holds the grip unit 1100. When the driver holds the grip unit 1100, the control unit 1300 may conclude the while-driving driver warning pattern.

Similar to the door-open pattern, the autonomous driving pattern may be a pattern in which the brightness of the illumination unit 1200 varies according to the second period signal.

The simple touch pattern may be the brightness of the illumination unit 1200 varying according to a third period signal. For example, the third period signal may be a sine wave having a shorter period than the first period signal.

The simple touch pattern having a third period signal having the shorter period than the second period signal of the autonomous driving pattern gives an impression that the vehicle changes from calm breathing to rapid breathing when the driver touches the grip unit 1100, thereby creating a situation in which the vehicle wakes up.

The approval pattern may be a pattern in which flicking occurs once in a preset color. For example, the approval pattern may be a square wave having a specific period.

The steering wheel according to another embodiment of the present disclosure may operate in the above-described pattern in the same manner as in the embodiments of FIGS. 10 thorough 12.

The steering wheel 10 according to the above-described embodiment provides information about the situation or state of a vehicle through a steering wheel, which is a vehicle component closest to a driver, so that the driver may very easily recognize a notification provided by the vehicle.

In addition, when an emergency situation occurs in the vehicle, the steering wheel 10 preemptively induces a driver's response, thereby significantly reducing accidents caused by driver's negligence due to introduction of autonomous driving.

Moreover, the steering wheel 10 creates an aesthetic effect inside the vehicle by using an illumination unit as well as providing information, thereby converting the vehicle into a space where one can stay for a long time rather than a simple transportation means.

Various embodiments described herein may be implemented by hardware, middleware, microcode, software, and/or combinations thereof. For example, various embodiments may be implemented in one or more application specific semiconductors (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions presented herein, or combinations thereof.

Although operations are shown in the drawings in a particular order, it should not be understood that these operations need to be performed in the particular order illustrated to achieve a desired result, or a sequential order, or all of the illustrated operations need to be performed. In some circumstances, multitasking and parallel processing may be advantageous.

Although the present disclosure has been described with reference to the embodiments shown in the drawings, this is merely an example. It will be understood by one of ordinary skill in the art that various modifications and equivalent other embodiments may be made without departing from the spirit and scope of the present disclosure as defined by the following claims.

| [Description of reference numerals] | |
| --- | --- |
| 10: steering wheel | 11: ADAS |
| 100: grip unit | 200: illumination unit |
| 201: light-emitting devices | 210: first illuminator |
| 220: second illuminator | 230: third illuminator |
| 300: control unit | 400: spoke |
| 500: hub | 600: manipulation unit |

What is claimed is:

1. A steering wheel of a vehicle capable of autonomous driving, the steering wheel comprising:
    a grip unit having a rim shape and held by a driver to steer the vehicle;
    an illumination unit provided in each of a left portion and a right portion of the grip unit in a circumferential direction of the grip unit, and configured to light up in a predetermined pattern,
    wherein the illumination unit comprises:
        a first illuminator including a plurality of light-emitting devices provided around a portion where a spoke is connected to the grip unit in order to express a hold induction pattern and a hold notification pattern, the first illuminator being provided in each of the left and right portions of the grip unit in the circumferential direction of the grip unit; and
        a second illuminator provided at a different location from the first illuminator and in a different shape from the first illuminator in order to express a vehicle state pattern; and
    a control unit configured to:
        control the first illumination unit to light up in the hold induction pattern for inducing holding by the driver according to a situation of the vehicle and the vehicle state pattern for expressing a state of the vehicle to the driver,
        determine that the driver is holding the grip unit and control the first illuminator to express the hold notification pattern when the driver holds the grip unit,
        automatically transfer a steering right of the vehicle to the driver in response to the determination that the driver is holding the grip unit, and
        control the second illumination unit to light up in an approval pattern in response to transfer of the steering right of the vehicle to the driver being completed.

2. The steering wheel of claim 1, wherein the hold induction pattern is to control the first illumination unit to sequentially light up and light out in a first color in the circumferential direction of the grip unit.

3. The steering wheel of claim 2, wherein the control unit is further configured to control the first illumination unit to light up and light out in a different color from the hold induction pattern in the circumferential direction of the grip unit, when the driver already holds the grip unit when an engine of the vehicle starts.

4. The steering wheel of claim 1, wherein the hold notification pattern is to control the first illumination unit to sequentially light up and light out in a different color from the hold induction pattern in the circumferential direction of the grip unit.

5. The steering wheel of claim 1, wherein the control unit is further configured to control the illumination unit to light up in a warning pattern, in a warning situation according to a signal of an advanced driver assistance system (ADAS) of the vehicle.

6. The steering wheel of claim 1, wherein the control unit is further configured to change a lighting pattern of the illumination unit according to whether the vehicle is autonomously driven, and change the lighting pattern or a color of the illumination unit according to whether the driver touches the grip unit during autonomous driving of the vehicle.

7. The steering wheel of claim 6, wherein the control unit is further configured to control the second illumination unit to light up in the approval pattern when the driver switches to a manual driving mode during autonomous driving of the vehicle.

8. The steering wheel of claim 6, wherein, when an end of an autonomous driving mode is expected, the control unit is further configured to control the first illumination unit to light up in the hold induction pattern a certain time earlier than an end expected time point in order to induce the driver to hold the grip unit.

9. The steering wheel of claim 1, wherein the control unit is further configured to control the illumination unit to flicker in conjunction with a turn indicator of the vehicle.

10. The steering wheel of claim 1, wherein the control unit is further configured to control the illumination unit to flicker in conjunction with a blind-spot warning of the vehicle.

11. The steering wheel of claim 1, wherein the control unit is further configured to control a light area of the first illuminator to sequentially increase according to a battery charging state of the vehicle.

12. The steering wheel of claim 1, wherein the control unit is further configured to control light-emitting devices of the first illumination unit to light up in different colors when the vehicle enters a utility mode.

13. The steering wheel of claim 1, wherein
    the illumination unit further comprises a third illuminator provided on a hub portion of the steering wheel, and
    the control unit is further configured to control the third illuminator to light up in different colors according to different driving modes of the vehicle.

14. A steering wheel of a vehicle capable of autonomous driving, the steering wheel comprising:

a grip unit having a rim shape and held by a driver to steer the vehicle;
an illumination unit provided to be symmetrical in left and right portions of the grip unit,
wherein the illumination unit comprises:
- a first illuminator including a plurality of light-emitting devices provided around a portion where a spoke is connected to the grip unit in order to express a hold induction pattern and a hold notification pattern, the first illuminator being provided in each of the left and right portions of the grip unit in the circumferential direction of the grip unit and
- a second illuminator provided at a different location from the first illuminator and in a different shape from the first illuminator in order to express a vehicle state pattern; and a control unit configured to:
- control the first illumination unit to light up in the hold induction pattern for inducing holding by the driver according to a situation of the vehicle and the vehicle state pattern for expressing a state of the vehicle to the driver,
- determine that the driver is holding the grip unit and control the first illuminator to express the hold notification pattern when the driver holds the grip unit,
- automatically transfer a steering right of the vehicle to the driver in response to the determination that the driver is holding the grip unit, and
- control the second illumination unit to light up in an approval pattern in response to transfer of the steering right of the vehicle to the driver being completed.

15. The steering wheel of claim 14, wherein the hold induction pattern is to change brightness of the first illumination unit according to a first period signal that is previously determined.

16. The steering wheel of claim 15, wherein the hold notification patter corresponds to flickering when the driver holds the grip unit.

17. The steering wheel of claim 15, wherein, when a door of the vehicle is open, the control unit is further configured to control the illumination unit so that the brightness of the illumination unit varies according to a second period signal having a slower period than the first period signal.

18. The steering wheel of claim 14, wherein the control unit is further configured to control the illumination unit to light up in a warning pattern in a warning situation according to a signal of an advanced driver assistance system (ADAS) of the vehicle and control the illumination unit so that the warning pattern is concluded when the driver holds the grip unit.

19. The steering wheel of claim 14, wherein the control unit is further configured to change a lighting pattern of the illumination unit according to whether the vehicle is autonomously driven, and change the lighting pattern or a color of the illumination unit according to whether the driver touches the grip unit during autonomous driving of the vehicle.

20. The steering wheel of claim 19, wherein, when an end of an autonomous driving mode is expected, the control unit is further configured to control the first illumination unit to light up in the hold induction pattern a certain time earlier than an end expected time point in order to induce the driver to hold the grip unit.

21. The steering wheel of claim 14, wherein the first illumination unit is provided in a form of strips that are each arranged in a horizontal direction of the grip unit or at an angle.

* * * * *